United States Patent [19]
Smith, III

[11] Patent Number: 6,106,026
[45] Date of Patent: Aug. 22, 2000

[54] LOCKING DEVICE FOR UNDERSEA HYDRAULIC COUPLING

[75] Inventor: Robert E. Smith, III, Missouri City, Tex.

[73] Assignee: National Coupling Company Inc., Stafford, Tex.

[21] Appl. No.: 09/472,941

[22] Filed: Dec. 27, 1999

Related U.S. Application Data

[62] Division of application No. 09/003,005, Jan. 5, 1998.

[51] Int. Cl.⁷ ..................................................... F16J 15/00
[52] U.S. Cl. ............................................... 285/85; 285/84
[58] Field of Search .................. 137/614.04; 285/84, 285/85, 91

[56] References Cited

U.S. PATENT DOCUMENTS

| | | | |
|---|---|---|---|
| 1,128,634 | 2/1915 | Talbot ........................................ | 285/85 |
| 1,913,982 | 6/1933 | Fox . | |
| 2,129,704 | 9/1938 | Meyer ........................................ | 284/19 |
| 2,457,251 | 12/1948 | Main, Jr. ................................... | 284/19 |
| 2,684,860 | 7/1954 | Rafferty .................................... | 285/85 |
| 2,757,684 | 8/1956 | Ulrich ....................................... | 137/515 |
| 2,772,898 | 12/1956 | Seeler ....................................... | 285/190 |
| 3,112,766 | 12/1963 | Zeliznak et al. ........................ | 137/614.05 |
| 3,201,151 | 8/1965 | Westveer .................................. | 285/73 |
| 3,217,746 | 11/1965 | Volsine ..................................... | 137/614.04 |
| 3,331,609 | 7/1967 | Moran ....................................... | 277/84 |
| 3,422,864 | 1/1969 | Allinquant ................................ | 141/347 |
| 3,474,827 | 10/1969 | Rosell ........................................ | 137/614.06 |
| 3,498,324 | 3/1970 | Breuning .................................. | 137/614.04 |
| 3,551,005 | 12/1970 | Brun ........................................... | 285/10 |
| 3,625,251 | 12/1971 | Nelson ...................................... | 137/614.04 |
| 3,635,793 | 1/1972 | Kolb et al. ............................... | 285/320 |
| 3,727,952 | 4/1973 | Richardson ............................... | 285/101 |
| 3,918,485 | 11/1975 | Weber et al. ............................ | 137/594 |
| 4,086,939 | 5/1978 | Wilcox et al. ........................... | 137/614.03 |
| 4,089,549 | 5/1978 | Vyse .......................................... | 285/137 |
| 4,426,104 | 1/1984 | Hazelrigg ................................. | 285/26 |
| 4,438,779 | 3/1984 | Allread ...................................... | 137/914.06 |
| 4,453,566 | 6/1984 | Henderson et al. ..................... | 137/614.02 |
| 4,477,105 | 10/1984 | Wittman et al. ......................... | 285/18 |
| 4,582,347 | 4/1986 | Wilcox et al. ........................... | 285/12 |
| 4,652,016 | 3/1987 | Bormioli ................................... | 285/2 |
| 4,745,948 | 5/1988 | Wilcox ...................................... | 137/614.05 |
| 4,915,419 | 4/1990 | Smith, III ................................. | 285/26 |
| 4,924,909 | 5/1990 | Wilcox ...................................... | 137/614.05 |
| 5,323,812 | 6/1994 | Wayne ....................................... | 137/614.05 |
| 5,342,098 | 8/1994 | Wilkins ..................................... | 285/26 |
| 5,406,980 | 4/1995 | Allread et al. ........................... | 137/614.03 |
| 5,899,228 | 5/1999 | Smith, III ................................. | 137/614.04 |

FOREIGN PATENT DOCUMENTS 871888  7/1961  United Kingdom .

*Primary Examiner*—John Fox
*Attorney, Agent, or Firm*—Fulbright & Jaworski

[57] ABSTRACT

A locking mechanism for male and female coupling members for use in undersea production and drilling applications is disclosed. At least one pin extends radially from the female member. The pin enters an L-shaped slot in a guide sleeve extending longitudinally from the male member. A lock bar moveable between a locked and unlocked position holds the pin in the L-shaped slot.

5 Claims, 5 Drawing Sheets

FIG. 11A
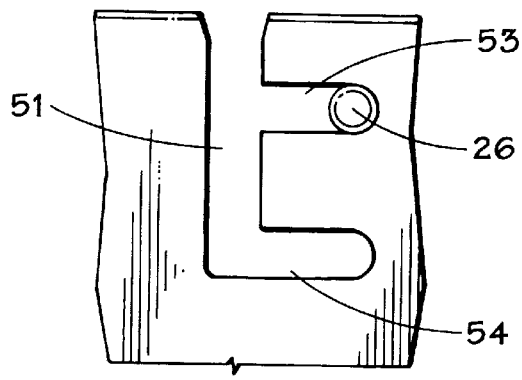
FIG. 11B
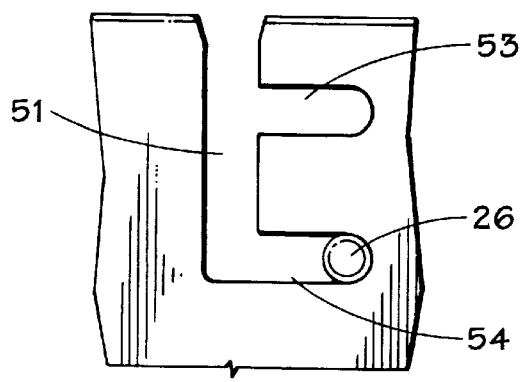
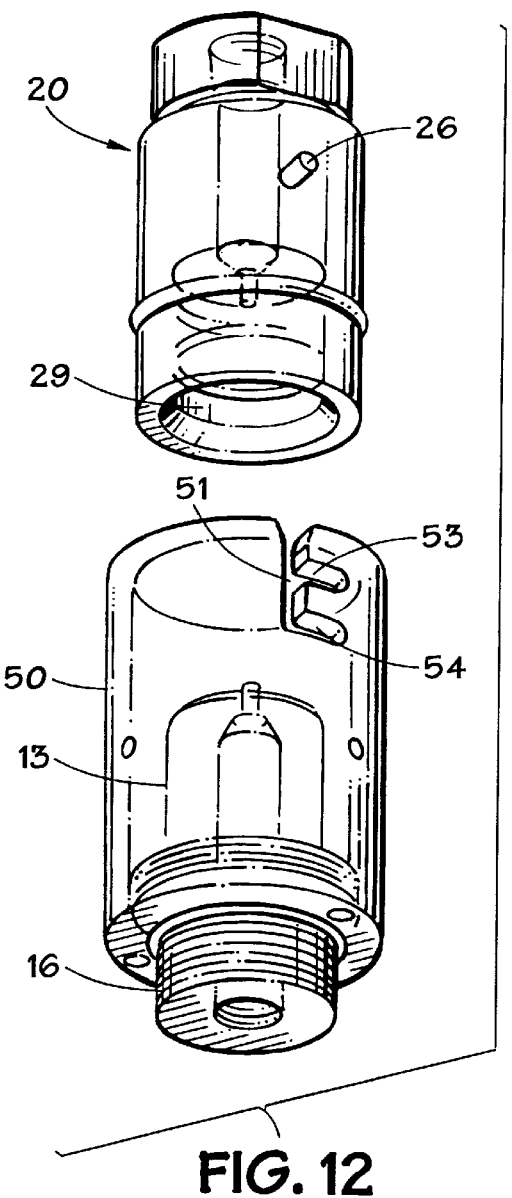
FIG. 12

LOCKING DEVICE FOR UNDERSEA HYDRAULIC COUPLING

This is a divisional of co-pending application Ser. No. 09/003,005 filed Jan. 5, 1998.

BACKGROUND OF THE INVENTION

1. Field of the Invention

The present invention relates to hydraulic couplings used in undersea drilling and production applications. More particularly, the invention involves a locking device for restraining axial and longitudinal movement of the male coupling member with respect to the female coupling member in undersea applications.

2. Description of the Related Art

Subsea hydraulic couplings are old in the art. Subsea hydraulic couplings are shown, for example, in U.S. Pat. No. 4,694,859 to Robert E. Smith III, and other patents assigned to National Coupling Company, Inc. of Stafford, Tex. The couplings generally consist of a male member and a female member with sealed fluid passageways connecting therebetween. The female member generally is a cylindrical body with a relatively large diameter longitudinal bore at one end and a relatively small diameter longitudinal bore at the other end. The small bore facilitates connections to hydraulic lines, while the large bore seals and slidingly engages the male member of the coupling.

The male member includes a cylindrical body having an outer diameter approximately equal to the diameter of the large female bore, and a connection at its other end for hydraulic lines. When the cylindrical body of the male member is inserted into the large bore of the female member, according to various embodiments of the device, fluid flow is established between the male member and the female member. In undersea hydraulic applications, it is preferable to connect the male member to the female member by sliding it into the large bore of the female member, without rotation or other manipulation of one or both coupling members.

The male member or female member may be connected to a junction plate of a manifold. The male or female member may be attached to the junction or manifold plate using various means such as set screws or threads. In some cases, the male member is attached to one junction or manifold plate, while the female member is attached to an opposing plate so as to face the male member and align with it.

In many subsea applications several subsea hydraulic couplings are grouped together on each junction or manifold plate. For example between 10 and 30 coupling members may be attached to each opposing plate. In the subsea environment, a diver may be required to connect the opposing plates together, and thereby connect the opposing coupling members on the plates. The coupling members may be simultaneously connected and the opposing plates are locked together. U.S. Pat. No. 4,915,419 to Robert E. Smith III, assigned to National Coupling Company, Inc. of Stafford, Tex. discloses a sliding lock plate used for connecting together subsea hydraulic couplings.

Attempts have been made in the past to eliminate or reduce the problems of high separational forces of the couplings due to high pressure in the hydraulic system, by individually locking together the male and female members in each coupling. In the subsea environment, however, individually locking each of the hydraulic coupling members together has been a difficult undertaking.

A proposed solution was the use of lock sleeves for each subsea hydraulic coupling. The lock sleeve is pulled back axially or longitudinally to release balls inside the female coupling member. After the male member has entered and seated in the female member, the lock sleeve is released, allowing the balls to reposition in the female member and lock the male member and female member together. However, the lock sleeve has a number of disadvantages. It is relatively heavy and bulky, which is undesirable in the subsea environment. Additionally, the lock sleeve requires substantial vertical clearance sufficient to allow for the longitudinal movement necessary for connection or disconnection. Other problems are caused by a build up of silt, ocean debris and marine growth in the lock sleeve. The build up may result in jamming the lock sleeves and especially the locking balls. The couplings require high longitudinal thrust and cannot be disconnected without great difficulty after a period of time subsea.

A reliable solution is needed for locking together subsea couplings that can be easily handled in the subsea environment. In undersea drilling and production applications at increasingly greater depths, it is desirable to connect and/or disconnect the coupling members with robotics or other diverless apparatus such as a remote operating vehicle (ROV). A simple mechanism for connecting and locking together subsea hydraulic coupling members is needed that can be operated without a diver.

In subsea hydraulic applications, remote operating vehicles (ROVs) are needed to grip one of the coupling members (typically the female member) subsea and connect that member to the opposing coupling member. It also is desirable to discontinue flow of hydraulic fluid in the coupling by closing the valves in the male and female coupling members without disconnecting and retrieving one set of members (i.e., the female coupling members). For example, because of adverse weather conditions, strong currents and potential damage to the hydraulic system, it may be necessary to shut off the flow of hydraulic fluid to prevent leakage and ensuing damage to the subsea environment. Rather than retrieve the female coupling members while the male coupling members remain subsea, a reliable solution is needed for temporarily "parking" the female coupling members subsea when the valves of the coupling members are closed.

SUMMARY OF THE INVENTION

The present invention overcomes the above mentioned problems and disadvantages by providing a locking device for undersea hydraulic couplings that is simple to operate and can be locked and unlocked by a remote operating vehicle (ROV) at subsea locations. The locking mechanism includes a female member that enters a guide sleeve extending from the male coupling member. The female coupling member enters the guide sleeve, then the male member enters the female member bore. The guide sleeve has an L-shaped slot with a longitudinal portion and a circumferential portion. A pin extending radially outwardly from the body of the female coupling member enters the longitudinal portion of the L-shaped slot. After the pin reaches the end of the longitudinal portion, either coupling member or the guide sleeve may then be rotated sufficiently so that the pin slides to the end of the circumferential portion of the L-shaped slot. To lock the pin in that position, a lock bar attached to the guide sleeve is used. The lock bar may be pivotable on a hinge, or slideable. The lock bar may be spring biased if desired. The lock bar is closed to lock the pin in the circumferential portion of the L-shaped slot, thereby locking the female coupling member to the male coupling member. Alternatively, a ball nose plunger may be used to lock the pin extending from the female member in the circumferential portion of the L-shaped slot.

In the locked position, the pin is positioned in the L-shaped slot when the coupling member valves are open. In an alternative embodiment, the slot includes a second circumferential portion where the pin may be positioned and locked so that the female coupling member can be "parked" securely attached to the guide sleeve. This eliminates the need for an ROV to remove female coupling members to a secure location.

The advantages of the present invention include its simplicity high reliability and light weight. Another advantage of the present invention is that it is less bulky than the prior art. Another advantage of the present invention is that it will not tend to jam up with silt, ocean debris and marine growth during use.

BRIEF DESCRIPTION OF THE DRAWINGS

FIG. 11a is a perspective view of the L-shaped slot with the pin in the "park" position.

FIG. 11b is a perspective view of the L-shaped slot with the pin in the hydraulic flow position.

FIG. 12 is a perspective view of the male and female coupling members showing the L-shaped slot in the guide sleeve, the L-shaped slot having both a "park" position and a hydraulic flow position.

DETAILED DESCRIPTION OF PREFERRED EMBODIMENTS

Figure 1:
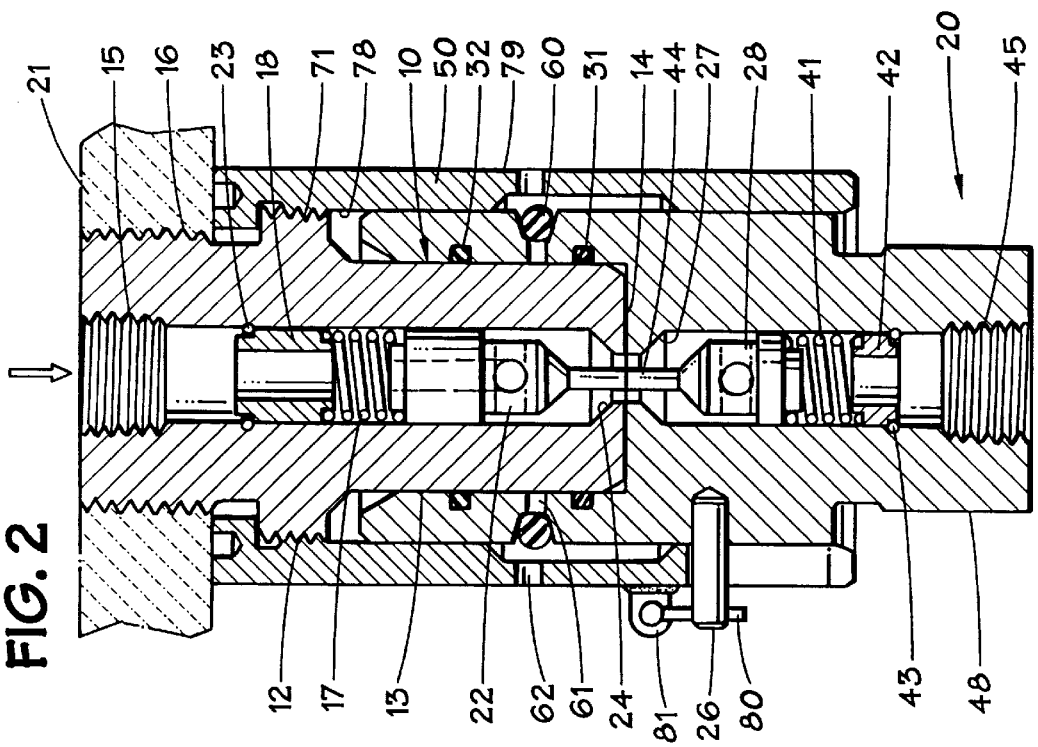
FIG. 1 is a cross section view of the female and male coupling members and locking device prior to locking the members together, according to a first embodiment of the present invention.

FIG. 1 is cross section view of a male coupling member (10) and a female coupling member (20) according to a first embodiment of the present invention. The male coupling member has an internal bore (15) extending therethrough and preferably has a poppet valve (22) inserted in the bore for controlling the flow of hydraulic fluid through the bore. Poppet valve (22) is urged into the normally closed position by poppet valve spring (17) which is held in the bore by spring collar (18) and lock ring (23). The male member has a flange (12) which may be externally threaded. Adjacent the flange is probe wall (13) which terminates at leading face (14). The handle (16) of the male member may be threaded to a manifold or junction plate (21). Poppet valve (22) is urged into the closed position against valve seat (24), until it is urged open by valve stem or actuator (19), which engages a valve stem or actuator (44) extending from the poppet valve in the female member.

Attached to the male member is guide sleeve (50) which has a bore (78) with an internal circumference sufficient to allow insertion of the female member (20) therein. In a first embodiment, the guide sleeve has a threaded portion (71) at one end thereof for engagement with the threaded flange (12) on the male member. The sleeve body (79) has a generally cylindrical shape. At the second end of the guide sleeve is an L-shaped slot which has a longitudinal portion to allow pin (26) extending radially outwardly from the female member body to be inserted therein.

Guide sleeve (50) has a bore dimensioned to slidingly receive female member (20). The female member is a cylindrical body having a longitudinal bore (45) and a receiving chamber (29) dimensioned to receive probe (13). Intermediate the female member body is a pin (26) extending radially outwardly therefrom. Pin (26) is dimensioned to have a diameter slightly less than the width of the L-shaped slot.

The female member preferably has a poppet valve (28) for controlling fluid flow through the bore. The poppet valve is urged into the normally closed position by valve spring (41) which is positioned against spring collar (42) and held in the bore by lock ring (43). In the closed position, poppet valve (28) of the female member is urged against valve seat (27). The receiving chamber of the female member may have one or more seals (31, 32) which may be elastomeric seals or pressure-energized metal seals for engaging the outer circumference of the probe of the male member. In a preferred embodiment, when the male member and female member are fully engaged, valve actuator (19) on poppet valve (22) contacts valve actuator (44) on poppet valve (28) to urge the poppet valves open and establish flow of hydraulic fluid between the male and female coupling members. In the embodiment shown in FIG. 1, poppet valve (22) of the a male member is urged open before poppet valve (28) of the female member, to flush hydraulic fluid through the male member and expel seawater through passage (61) in the female member. In this embodiment, O-ring (60) encircles the female member body in a circumferential groove thereby allowing hydraulic fluid and/or seawater to escape the female bore, while preventing entry of seawater into the coupling. Additionally, in the embodiment shown in FIG. 1, one or more passages (62) in the guide sleeve allow seawater and/or hydraulic fluid to be expelled out of the coupling during connection.

After initial entry of the female member into the guide sleeve, followed by entry of the male coupling member into the female member receiving chamber, pin (26) enters and slides into longitudinal portion (51) of the L-shaped slot. When the pin reaches the circumferential portion (52) of the slot, the female member may be rotated slightly (preferably less than 45 degrees) with respect to the sleeve, so that pin (26) slides in circumferential slot 52. When the pin reaches the end of the circumferential slot, it may be locked in that position with lock bar (80). Lock bar (80). according to a first preferred embodiment of the present invention, pivots on pivot mounting (81). The pivoting lock bar will be discussed in more detail below.

Figure 2:
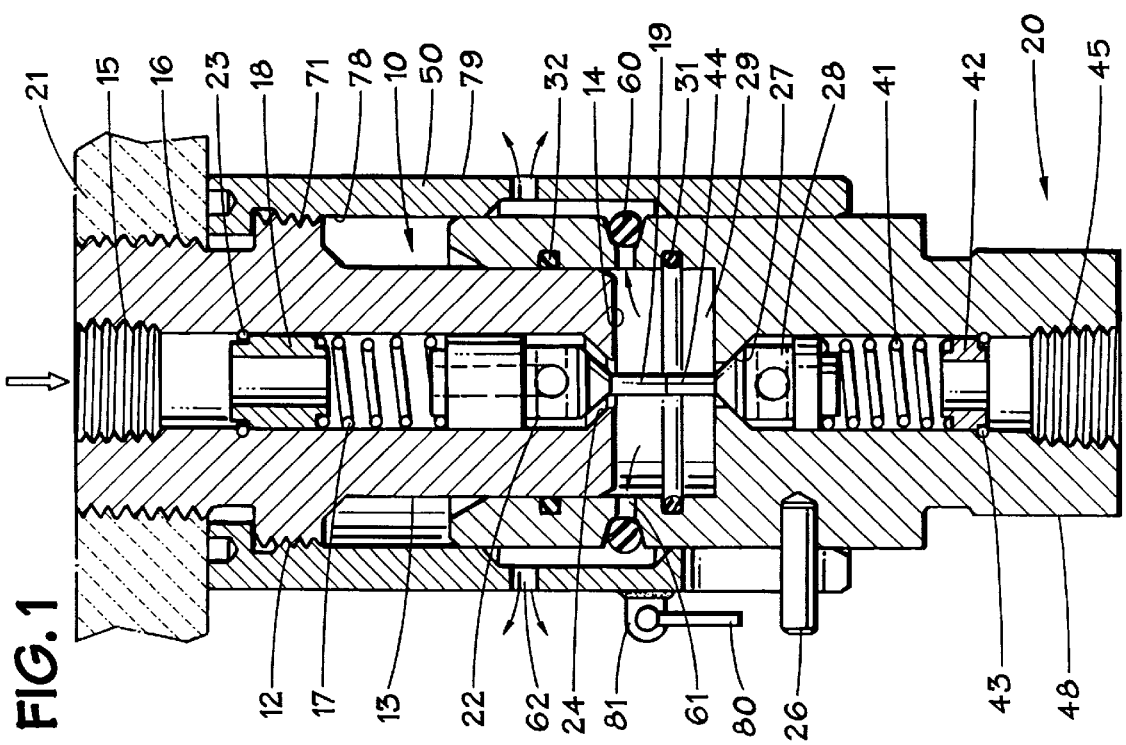
FIG. 2 is a cross section view of the connected male and female coupling members with the locking device engaged, according to a first embodiment of the present invention.

In FIG. 2, a male member and female member are shown according to the first embodiment, with the male member fully inserted into the female member and pin (26) fully inserted into the circumferential portion of the L-shaped slot. As shown in FIG. 2. lock bar (80) is pivoted on pivot mounting (81) to lock the pin in the circumferential portion of the slot. Thus, the female member is locked to the guide sleeve extending from the male member.

Figure 3:
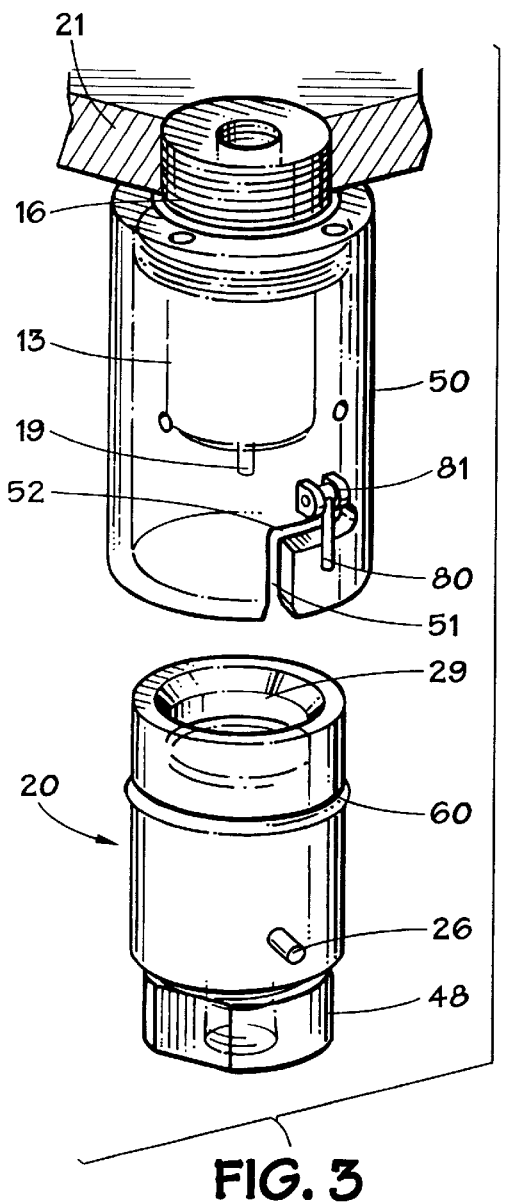
FIG. 3 is a perspective view of male and female coupling members prior to insertion of the male member into the female member bore according to a first embodiment.

Now referring to FIG. 3, a perspective view of the first embodiment is shown. In this embodiment, threaded handle (16) of the male member is connected to manifold (21). Female member (20) is insertable into guide sleeve (50), and probe (13) enters receiving chamber (29) of the female member. Pin (26) extends radially outwardly from the body of the female member. The female member may have a handle (48) at one end thereof, and, if desired, an O-ring (60) to allow seawater and/or hydraulic fluid to be expelled from receiving chamber (29). When the pin reaches the end of longitudinal portion (51) of the L-shaped slot, the female member may be rotated slightly with respect to the male member until the pin reaches the end of the circumferential portion. Lock bar (80) may be pivoted on pivot mounting (81) to hold the pin in the circumferential portion of the L-shaped slot.

Figure 4:
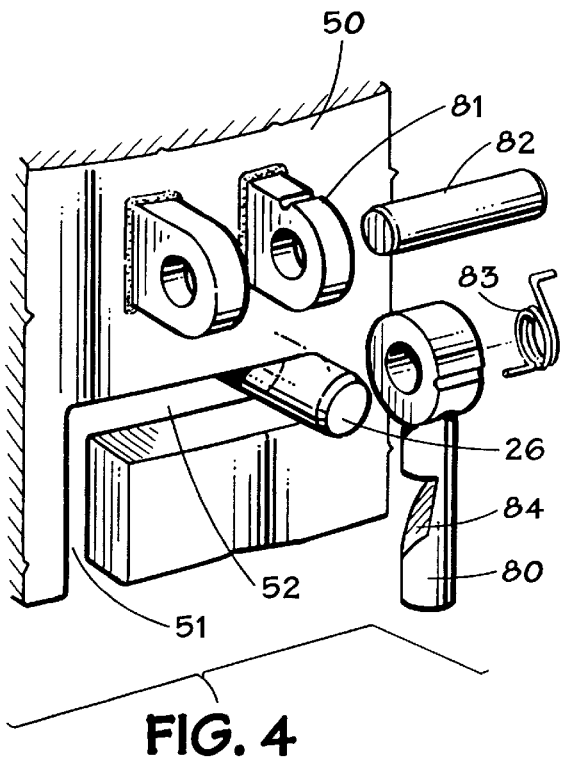
FIG. 4 is an exploded perspective view of the locking device of FIGS. 1–3.
Figure 5:
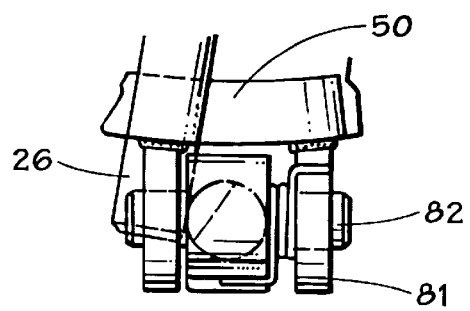
FIG. 5 is a cross section view of the locking device shown in FIG. 4.

FIG. 4 shows the locking device according to the first embodiment of the present invention in more detail. The locking device, which is positioned on the outer circumference of the guide sleeve adjacent the L-shaped slot, is held by pivot mounting (81) and pin (82) inserted therethrough to hold lock bar (80) in pivoting relationship thereto. If desired spring (83) may be interconnected between the lock bar (80) and pivot mounting (81) to bias the lock bar toward the locked position. Additionally, lock bar (80) may be provided with a beveled surface (84) to allow pin (26) to move into the locked position without requiring handling of the lock bar (80) for engagement, and the opposing surface may not be beveled, if desired, so that the lock bar must be manually disengaged to unlock pin (26). FIG. 5 illustrates the pivot mounting of FIG. 4. including the pivot mounting (81), pin (82) and lock bar (80). with pin (26) in the locked and engaged position.

Figure 6:
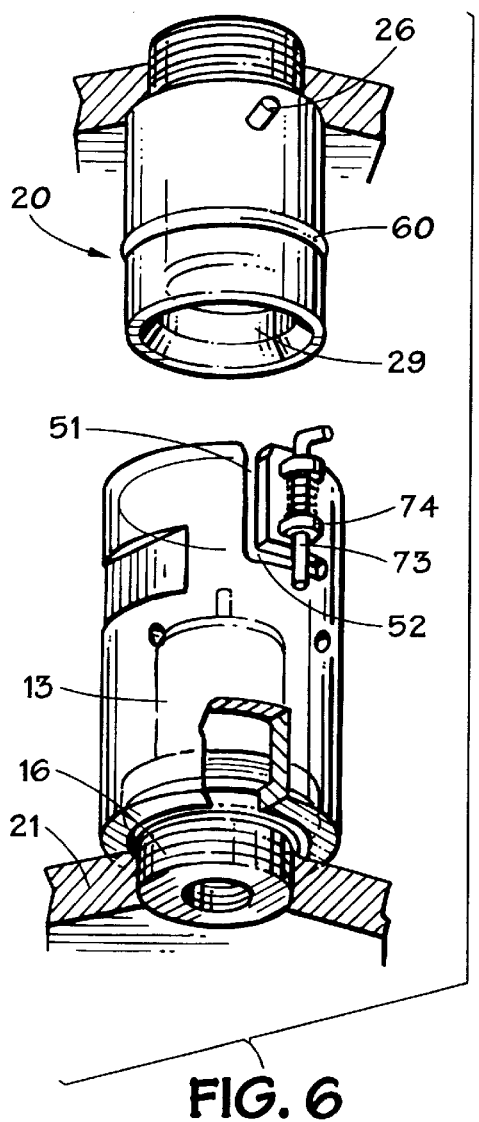
FIG. 6 is a perspective view, partially in section, of the male and female coupling members and locking device according to a second embodiment of the present invention.

Now referring to FIG. 6 of the drawing, a second embodiment of the present invention is shown. Female member (20) is insertable into sleeve (50) which surrounds probe (13). In this embodiment, the handle (16) of the male member is threaded to manifold (21). Pin (26) enters L-shaped slot having a longitudinal portion (51) and a circumferential portion (52). The lock bar (73), according to a second embodiment of the present invention, is held in sliding relationship by mounting blocks (74) which are affixed to the outer circumference of sleeve (50).

Figure 8:
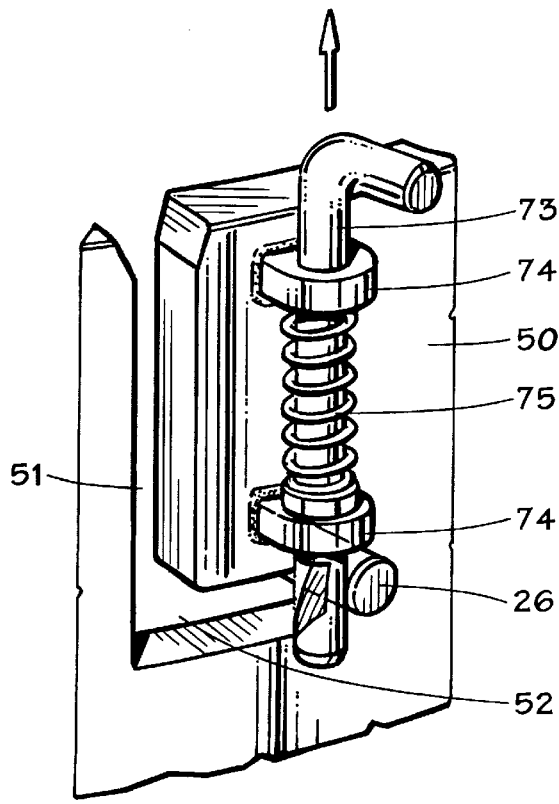
FIG. 8 is a perspective view of the locking device according to a second embodiment of the present invention.

The locking device, according to the second embodiment, also is shown in more detail in FIG. 8 of the drawing. In this embodiment, lock bar (73) is held to the outer circumference of the guide sleeve (50). Two or more mounting blocks (74) are provided on the outer circumference of the guide sleeve. The locking device may be spring biased, using spring (75), and, if desired, one surface of the lock bar (73) may be beveled to allow pin (26) to be engaged in the fully locked position without requiring manual assistance. In this embodiment, spring (75) biases the lock bar (73) into the locked position, where pin (26) is held in circumferential slot (52).

Figure 7:
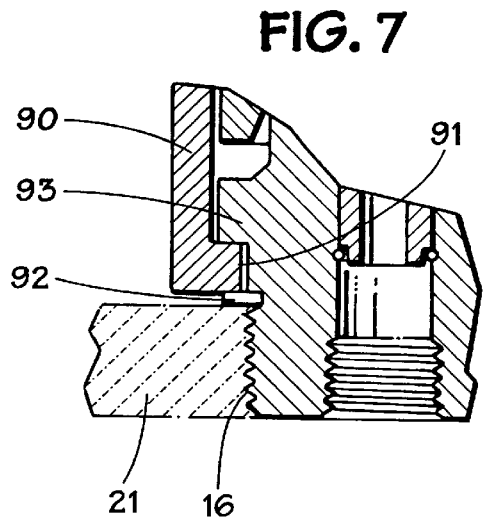
FIG. 7 is a cross section view of the male member and a rotatable guide sleeve according to another embodiment of the present invention.

FIG. 7 is a cross-section view of a portion of the guide sleeve which may be rotatable with respect to the male member and/or female member of the coupling. In this embodiment, guide sleeve (90) has an inwardly directed flange (91) which is held between shoulder (93) of the male member and washer (92). This embodiment of the guide sleeve allows the sleeve to be rotated while both the male and female members are stationary.

Figure 9:
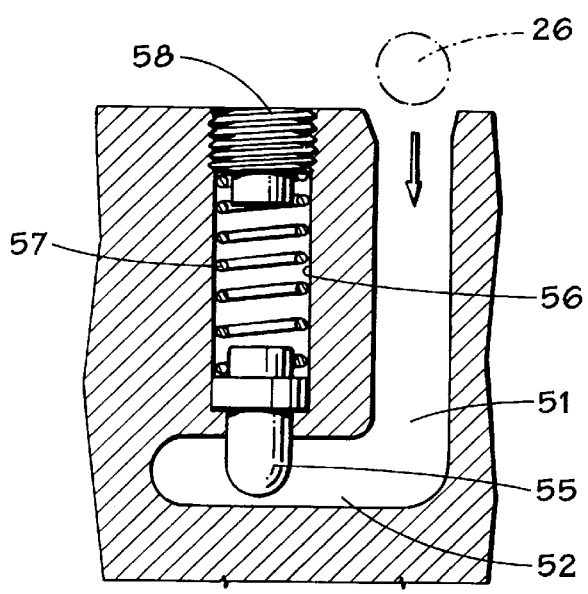
FIG. 9 is a cross section view of the locking device according to a third embodiment of the present invention.
Figure 10:
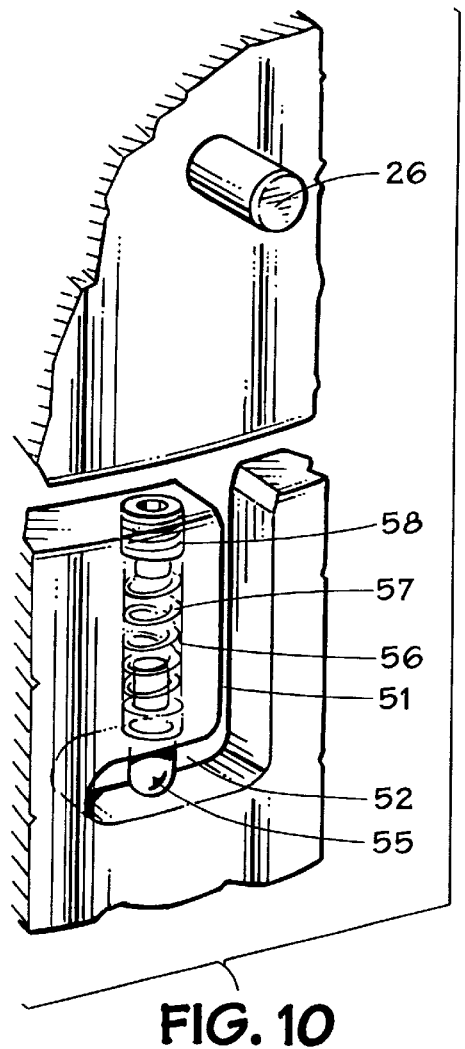
FIG. 10 is a perspective view of the locking device according to a third embodiment of the present invention.

FIG. 9 of the drawing illustrates a third embodiment of the locking device. In this embodiment, ball nose plunger (55) locks the pin (26) in the circumferential portion (52) of the L-shaped slot. Ball nose plunger (55) and spring (57) are held in plunger bore (56) with set screw (58). The third embodiment of the locking device is illustrated in perspective view in FIG. 10 of the drawing.

FIGS. 11A and 11B show another preferred embodiment of the L-shaped slot having a first circumferential slot (53) and a second circumferential slot (54). The first circumferential slot allows engagement of pin (26) therein while the valves of the male and female coupling members are closed. This allows the female to have a "park" position when not required to be fully connected to the male member. This eliminates the time required for an ROV to reposition the female member when it is not in use. The second circumferential slot (54) is for the hydraulic flow position when both male and female coupling members poppet valves are opened.

Although it is preferred that one pin extend radially from the female coupling member, in combination with a single L-shaped slot in the guide sleeve, two or more pins (and L-shaped slots) also may be used in other embodiments within the scope of the invention.

Although variations in the embodiment of the present invention may not each realize all the advantages of the invention, certain features may become more important than others in various applications of the device. The invention, accordingly, should be understood to be limited only by the scope of the appended claims.

What is claimed is:

1. An undersea hydraulic coupling, comprising:
   (a) a male member comprising a cylindrical body with a probe section extending therefrom, a cylindrical sleeve surrounding the probe section, the cylindrical sleeve having a slot therein, and an annulus between the probe section and the cylindrical sleeve;
   (b) a female member comprising a cylindrical body with a receiving chamber dimensioned to receive the probe section therein and at least one projection extending radially from the cylindrical body; and
   (c) a locking bar in the cylindrical sleeve, the locking bar comprising a bar slideable longitudinally to capture the projection in the slot to hold the female member to the cylindrical sleeve.

2. The undersea hydraulic coupling of claim 1 wherein the locking bar is spring biased to the locked position.

3. The undersea hydraulic coupling of claim 1 further comprising a passage in the cylindrical sleeve adjacent the slot, the lock bar sliding within the passage between the unlocked position and extending from the passage in the locked position.

4. The undersea hydraulic coupling of claim 1 wherein the slot is L-shaped.

5. The undersea hydraulic coupling of claim 1 wherein the projection is captured in a first position wherein the male and female coupling members are fully engaged, and a second position wherein the coupling members are partially engaged.

* * * * *